C. H. VEEDER.
MILEAGE REGISTER FOR TIRES.
APPLICATION FILED DEC. 26, 1914.
1,151,743.
Patented Aug. 31, 1915.
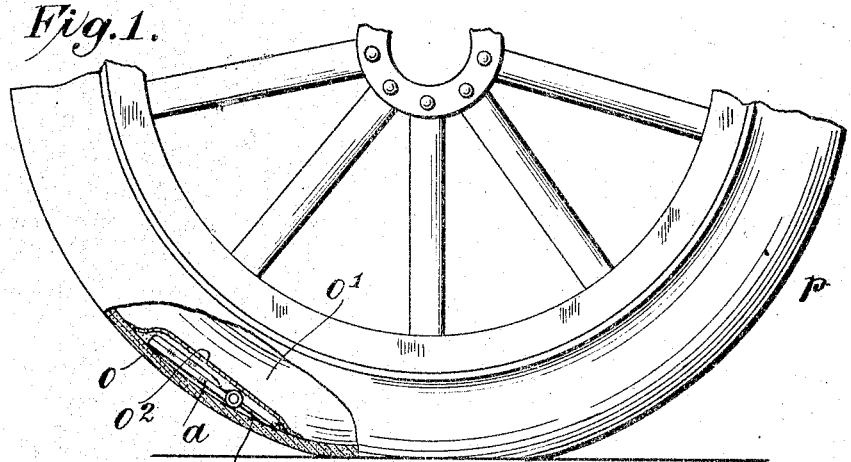
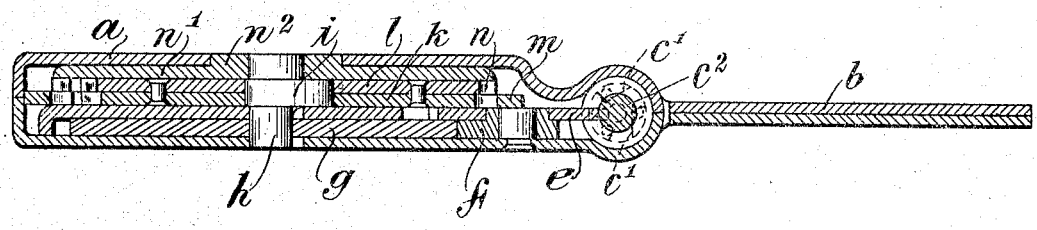
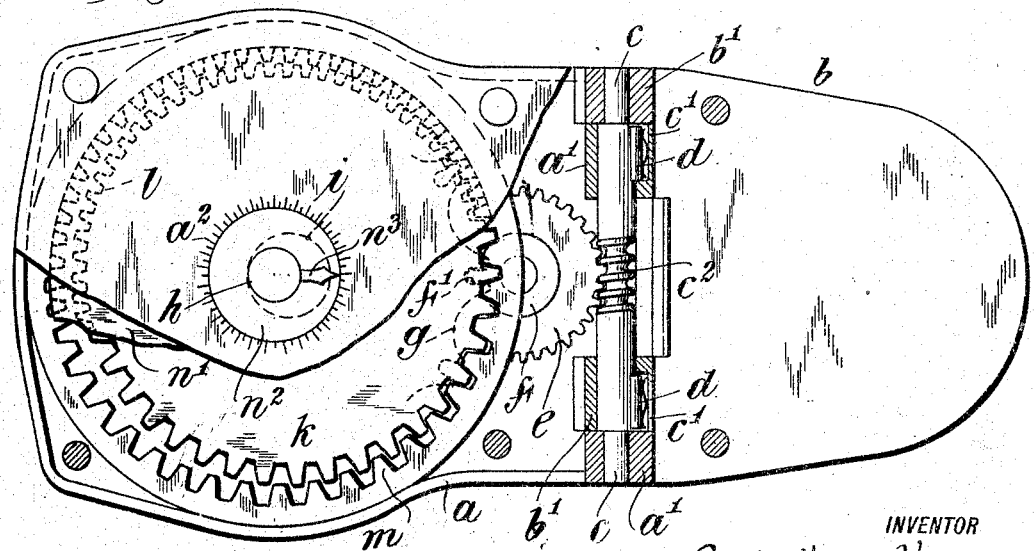
WITNESSES:
INVENTOR
Curtis Hussey Veeder
BY
ATTORNEYS

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

MILEAGE-REGISTER FOR TIRES.

1,151,743.

Specification of Letters Patent. Patented Aug. 31, 1915.

Application filed December 26, 1914. Serial No. 879,156.

*To all whom it may concern:*

Be it known that I, CURTIS HUSSEY VEEDER, a citizen of the United States, residing in the city of Hartford, in the State of Connecticut, have invented certain new and useful Improvements in Mileage-Registers for Tires, of which the following is a specification, reference being had to the accompanying drawings, forming a part hereof.

This invention has for its object to provide a register which will indicate approximately the extent of use of, or the distance traveled by, a vehicle tire and for convenience of terminology the device embodying the invention is referred to herein as a register of the mileage of such a tire.

It is now common practice for the manufacturers of tires, and particularly the manufacturers of pneumatic tires for automobiles, to guarantee a certain mileage for their tires at a stipulated air pressure, and it therefore becomes necessary to have a register which will register the approximate mileage of a tire at a known pressure and will also register, or compensate properly for, all mileage made while the tire is at a pressure below that stipulated. The wear on a tire at low pressure is greater than the wear on the same tire at the normal higher pressure at which it is intended to be used, so that the wear on a tire at a lower pressure for a given mileage is equal to the wear on the same tire at the normal higher pressure for a much greater mileage. In the illustrated embodiment of the invention the devices are so constructed as to cause the register to register a higher mileage whenever the pressure in the tire falls below a predetermined point, and the extent of this higher mileage is proportioned approximately to the extent of the fall of pressure, thereby affording compensation for the misuse of the tire and protecting the guarantor. The increased mileage registered by the tire when incompletely inflated is approximately the amount that would represent the mileage of the same tire if operated fully inflated. The device comprises generally registering mechanism for the mileage and means connected operatively to the registering mechanism and actuated by flexure of the tire through contact with the road surface to operate the registering mechanism. The range of movement of the actuating means for the registering mechanism is proportioned to the range of flexure of the tire so that when the latter increases through decrease of the air pressure, the register mileage increases in substantial accordance therewith. Reference is now to be had to the accompanying drawings for a detailed description of one form of the invention, which is illustrated merely by way of example, in which—

Figure 1 is a view partly in side elevation and partly in section of a wheel and a pneumatic tire therefor, part of the tire being broken away to show the improved register mounted in the tire. Fig. 2 is a detail view in vertical section and on a somewhat larger scale of a register embodying the invention. Fig. 3 is a view partly in plan and partly in horizontal section of the register shown in Fig. 2 part of the casing being broken away to show the registering devices.

The improved register comprises generally registering devices inclosed in a casing $a$, to which is hingedly secured a stiff arm or plate $b$ through a pintle pin $c$ passing through coöperating lugs $a'$ and $b'$ formed respectively along the meeting edges of the casing and arm. Interposed between the arm $b$ and the pintle $c$ are clutch devices, of any approved form, illustrated herein as spring-pressed rollers $d$ resting in peripheral recesses $c'$ formed in the pintle. By the interposition of these rollers $d$ the arm $b$ is permitted to move freely about the pintle $c$ and with respect to it, in one direction, but is locked to the pintle and serves to rock it when moved in the opposite direction. This rocking movement of the pintle $c$ in one direction is transmitted to the registering mechanism and the extent thereof translated to the indicating dial of the register in convenient units of distance, such as miles, in a manner now to be described.

The pintle $c$ has formed thereon worm threads $c^2$ which engage a worm gear $e$ fixed on the hub of a mutilated gear wheel $f$, the tooth $f'$ of which coöperates with a Geneva gear $g$ upon each revolution of the wheel $f$. The shaft $h$ of the Geneva gear $g$ carries an eccentric $i$, the face of which engages two spur gears $k$ and $l$, secured to each other, and operatively disposed respectively to a fixed internal gear $m$ and a rotatable internal gear $n$, by which the last named gear is given a differential rotative movement with respect to the fixed internal gear at a speed greatly reduced from the rotative speed of the shaft $h$, all as appears from prior Letters Patent of the United States No. 548,482 granted to the applicant on October 22, 1895. The rotatable internal gear $n$ has its face $n'$ carried to a hub $n^2$ which fits snugly in an opening in the wall of the casing $a$ and has its face flush with said wall whereby an indicating mark, such as $n^3$ on the hub, can be readily observed with respect to a convenient scale $a^2$, which may be marked on the wall of the casing $a$ about the hub. This scale may be graduated, for instance, into sub-divisions of 100 miles, and main divisions of 200 miles, thereby enabling the mileage of the tire, as registered in the manner to be described, to be read off with substantial accuracy. It is to be understood, however, that in a device of this character, great accuracy is not essential as the mileage guarantee usually runs into the thousands.

In practice the improved register will be mounted on the inner face of the shoe $o$ of the tire $p$ and the casing $a$ will be fixed thereto, while the arm $b$ will lie in operative relation to the inner face of the tread of the tire so as to be actuated by flexure when the tread moves into contact with the road surface. The register will be constructed of such shape and size as to satisfy most efficiently the requirements of use under the conditions encountered. In Fig. 1 the register is illustrated in somewhat exaggerated proportions, the real distortion of the inner tube $o'$ of the tire being, in practice, much less than that indicated. Further, the position of the register on the inner face of the tire may be changed as desired, as it may prove to be more convenient to place the register substantially transversely to the tread rather than longitudinally thereof, as illustrated. The register may be held in position by means of a suitable canvas pocket, such as $o^2$ fixed to the inner wall of the shoe $o$ and united therewith along easy curves, thereby subjecting the inner tube $o'$ to minimum strains. With the register in the position described, the arm $b$ will normally be maintained in substantial alinement with the casing $a$ or in some other predetermined position with respect thereto and will be rocked periodically with respect to the casing when the tire moves to such position as to bring that portion of the tread in juxtaposition to the arm into contact with the road surface. As this portion of the tread of the tire flexes it will force the arm $b$ out of its predetermined position with respect to the casing and when this portion of the tread leaves the surface of the road, the arm $b$ will be returned to its normal position with respect to the casing under the stress of the elastic tire which resumes its normal arcuate outline at this portion as soon as this portion is relieved of the pressure to which it is subjected when in contact with the road the return movement being accompanied by a rocking of the pintle $c$ by reason of the clutching action of the rollers $d$, all in the manner hereinbefore described. This rocking movement of the pintle $c$ is sufficient to rotate the worm wheel $e$ a relatively slight distance and bring about actuation of the registering mechanism. The extent of the rocking of the arm $b$ will be dependent upon the air pressure in the tire as it will be evident that when this pressure becomes greatly reduced the extent of flexure of the tire will be greatly increased, so that the arm $b$ will be rocked through a far greater angle. Since the mileage register is dependent upon the extent of movement of the arm $b$, compensation for decreased air pressure is always made. The speed reduction between the arm $b$ and the indicating scale $a^2$ can be varied as conditions of use require. When the tire is presented by the user to the guarantor the register will of course be withdrawn from the pocket $o^2$ and the registered mileage observed.

Modifications in the structure of the registering mechanism, in the character of the actuating means therefor, and in the form of the connection between the actuating means and the registering mechanism, and re-arrangements of the parts and the relation of the register to the tire, may be made as conditions of use and good mechanical practice dictate without departing from the spirit of the invention, provided such modifications fall within the scope of the appended claims.

What I claim as my invention is:

1. In combination with a pneumatic tire for vehicles, a mileage register therefor, comprising registering mechanism and means operated by the relative movement or flexure of two adjacent parts of the tread of the tire to actuate the registering mechanism.

2. In combination with a pneumatic tire for vehicles, a mileage register therefor, comprising registering mechanism located within the fabric of the tire and actuating means for the registering mechanism carried thereby and movable with respect thereto, the means being engaged operatively by the tire and operated periodically by the flexure thereof.

3. In combination with a pneumatic tire for vehicles, a mileage register therefor, comprising registering mechanism located within the fabric of the tire, an arm movable with respect to the registering mechanism by flexure of the tire, and a clutch interposed between said arm and the registering mechanism to cause actuation of the registering mechanism when the arm is moved in one direction, while permitting free relative movement between the arm and the registering mechanism in the opposite direction.

4. In combination with a tire for vehicles, a mileage register therefor, comprising registering mechanism fixed with respect to the tire, an arm hingedly mounted thereon and movable by flexure of the tire, and a clutch interposed in the hinged connection to permit free movement of the arm with respect to the registering mechanism in one direction while causing actuation of the registering mechanism when the arm is moved in the opposite direction.

5. In combination with a pneumatic tire for vehicles, a mileage register therefor, mounted on the inner face of the tire, and including registering mechanism fixed with respect to the tire, an arm operatively connected to the registering mechanism and disposed in operative relation to the inner face of the tread of the tire so as to be moved by flexure of the tire at each revolution thereof, and a clutch interposed between the arm and the registering mechanism to transmit the movement of the arm to the registering mechanism.

6. In combination with a pneumatic tire for vehicles, a mileage register mounted on the inner face of the tire and including registering mechanism, an arm disposed in operative relation to the inner face of the tread of the tire and movable by flexure of the tire at each revolution thereof, said arm being hingedly mounted on the registering mechanism, and clutch devices interposed between the arm and the registering mechanism for transmitting movement of the arm to the registering mechanism.

This specification signed and witnessed this 23rd day of December A. D., 1914.

CURTIS HUSSEY VEEDER.

Signed in the presence of—
HELEN M. DANUS,
WORTHINGTON CAMPBELL.